Sept. 28, 1971     W. KEMMINER     3,608,347
PROCESS AND APPARATUS FOR MANUFACTURING RINGS
Filed Sept. 17, 1968     3 Sheets-Sheet 1
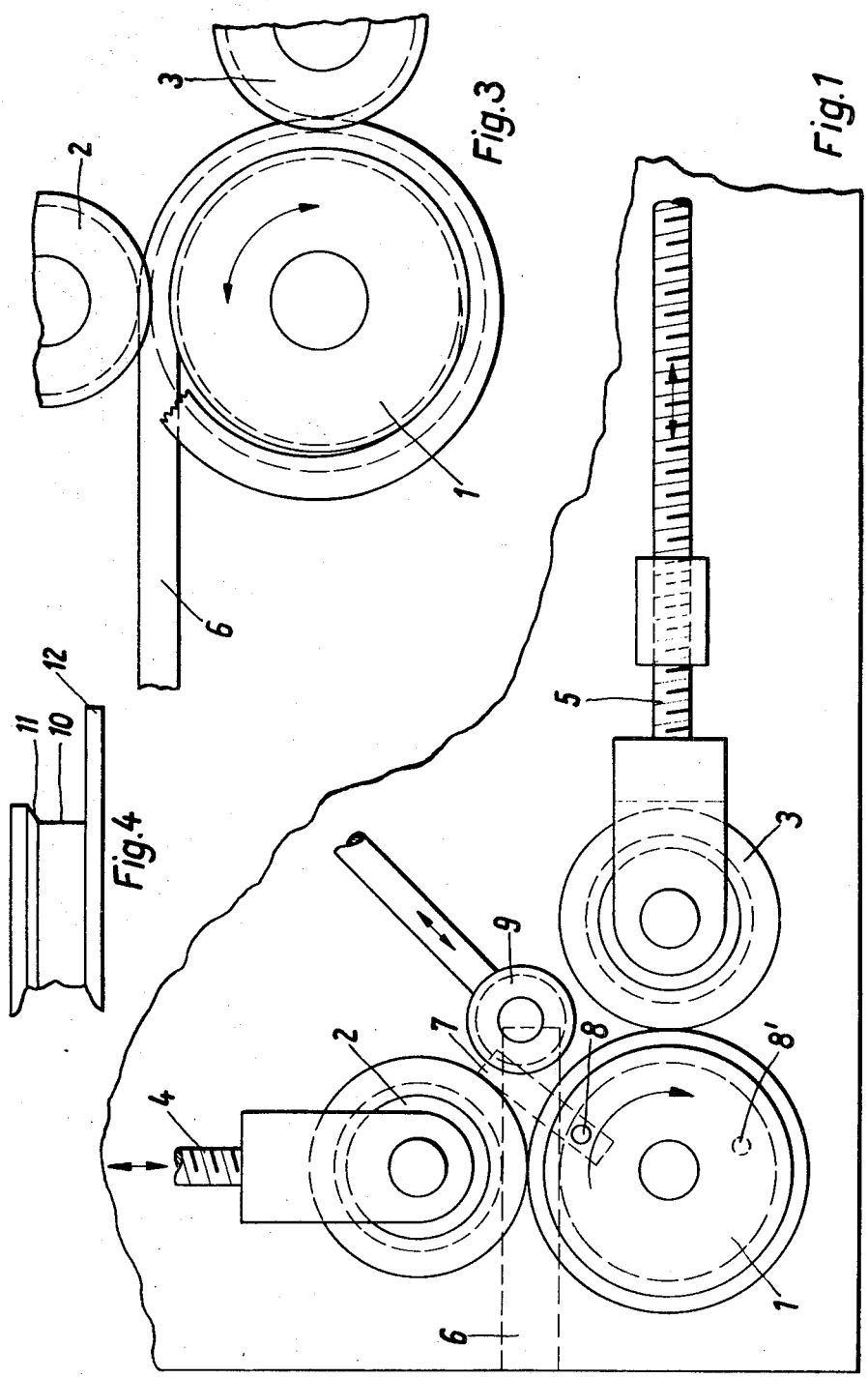
Inventor:
Werner KEMMINER
by: Arthur O. Klein
his Attorney

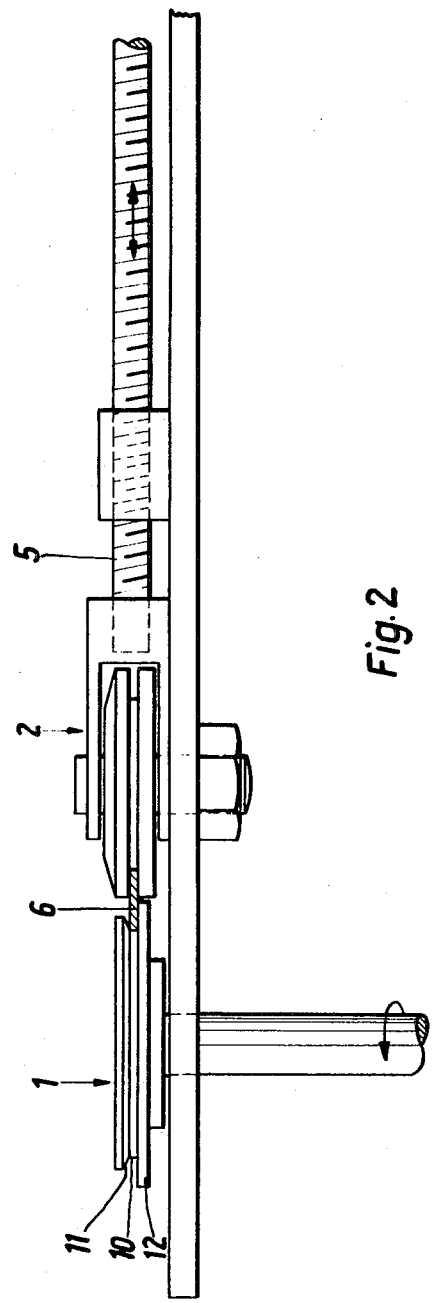

*Inventor:*
Werner KEMMINER
by: *Arthur O. Klein*
his *Attorney*

United States Patent Office 3,608,347
Patented Sept. 28, 1971

3,608,347
PROCESS AND APPARATUS FOR MANUFACTURING RINGS
Werner Kemminer, Ahle, near Bunde, Germany
Filed Sept. 17, 1968, Ser. No. 760,190
Int. Cl. B21f *3/04*
U.S. Cl. 72—142        5 Claims

ABSTRACT OF THE DISCLOSURE

A process and apparatus for producing continuously a spiral, cylindrical package by winding a flat iron band. The diameter of the formed cylindrical package corresponds substantially to the exterior diameter of the formed spiral rings. The flat iron band is wound around a circular support while being guided by circular rotatable means upwardly around the circular support. These circular rotatable guiding means bear against the flat iron band in the area where the band begins its run around the circular support in a tangential direction and in an area on the circular support removed approximately 90° therefrom.

BACKGROUND OF THE INVENTION

The invention relates to a process for manufacturing flat iron rings which can, for example, be used as flanges for pipes. It is already known to discontinuously form a flat-iron band by guiding it around a disk-like support member until the band forms a full 360° ring. The ring-shaped band is then cut off from the flat straight band and the ring is finished as a final product by welding the ends thereof together. The portion of the flat straight band which abuts against the disk-like support is then tensioned again and the whole afore-described cycle is repeated, thus only rendering one ring-shaped end product in each cycle. The apparatus for carrying out the afore-described process of the prior art includes a disk-like rotatably driven support member to which the flat straight band is guided in a tangential direction and the front end of which is firmly clamped to the periphery of the disk-like member. In the area where the flat band runs on the disk-like support member in a tangential direction a counter pressure roller is provided which presses the flat iron band against the support member during the running in of the flat iron band. The afore-described known process of the prior art, in which flange rings are produced discontinuously from flat iron bands, is highly inefficient because it is very time and labor consuming. Furthermore, the rings produced with the afore-described process differ considerably from each other.

There is also known a process for manufacturing piston rings wherein a straight band is continuously fed to a cylindrical package having a spirally shaped interior. After the spiral band has been formed it is cut into individual piston rings along one of its peripheral lines. The forming of the straight flat band is effected by means of oppositely positioned rollers which transport and simultaneously shape the flat band. The shaping by bending of the flat band is effected by gliding the band along a curved support member bearing against the band from one side thereof only. The band obtains its curved shape corresponding to that of the cylindrical package due to the pressure exerted by this curved support member. This process can only be carried out when the shaping of the flat band is effected in a vertical plane so that the spirally-shaped package has a horizontal central axis. This known process has also the drawback of not sufficiently precisely forming the spiral turns because the flat band is not sufficiently exactly and uniformly guided during the shaping process. For example, after the band has been shaped in the curved support member, the turns are deformed further due to their own dead weight, which becomes progressively larger as the formation of the cylindrical package progresses. Such deformations result in very imprecise end products. A particularly disturbing drawback of the afore-described process occurs when the shaping of a spiral is effected with the lower portion of the support member where a greater frictional drag occurs, which increases as the number of spirals increases, thereby forming a package in the shape of a truncated cone, the diameter of which continuously increases. Even if the support member is shortened in the aforedescribed process, so that the spirals are not guided to a large extent after having been formed, but freely swing, the resulting dead weight of the freely swinging spirals, which increases as the size of the package increases, still causes a reduction of the winding diameter of the spiral being guided in the support member. Consequently, a package in the shape of a truncated cone is formed again, which in this case has a continuously decreasing diameter. The dead weight of the formed spirals causes, furthermore, a vertical shifting of the spirals with respect to each other. Therefore, the aforedescribed process of the prior art is completely unsuitable for forming flat iron rings, which have a large weight and relatively low strength and elasticity.

It is further known to manufacture piston rings by drawing a flat iron band through a spiral groove disposed around a driven shaft. Although this drawn flat iron band does eventually receive a spiral shape, the individual separated rings cannot be removed from the grooved drive shaft without being at least slightly deformed. Therefore, the aforedescribed known process invariably causes a lot of waste because the taking off of the rings without permanently deforming them presupposes, contrary to actual facts, that they are made out of highly elastic, springy material which effects a return of the rings to a true ring shape after they have been taken off the grooved drive shaft.

Finally, there is also an arrangement for winding spiral springs which are drawn from steel wire. This arrangement includes a support member around which four pressure rollers are disposed. One of these four rollers is mounted on the central support member in the area where the flat steel wire is run-in in a tangential direction and, consequently, functions as a holding roller. Two other rollers are mounted around the periphery of the central support member and press the flat steel wire against the support member. These last mentioned two rollers, as well as a third pressure roller mounted at the end of the shaping run, cause a bending of the flat steel wire, which thus forms a spiral cylinder above the central support member. The latter props up the formed spiral package by means of a cylindrical member extending therefrom. The aforedescribed known arrangement is particularly designed to form spiral springs out of springy elastic material, but is not suitable for shaping flat iron rings by bending the flat workpiece because such an arrangement could not produce such rings with rigorously maintained uniform diameters. This is due to the fact that the shaping by bending is effected at three different pressure points located between the support member and the pressure rollers, which causes non-uniform deformations.

SUMMARY OF THE INVENTION

It is a general object of the invention to provide a process and arrangement for continuously manufacturing flat iron rings out of a flat iron band, which dispenses with any additional manufacturing steps for increasing the precision of the end product. The precision tolerances of the cold formed rings produced with the process of this invention remain at all times under 1%.

In the process of this invention the flat iron band is continuously wound into a spiral, cylindrical package.

The diameter of this package corresponds exactly to the diameter of the rings. The flat iron band is guided around a support member, thereby being shaped, and is then guided upwardly from the plane in which it was shaped. The band is pressed against the support member during this process in the area where it approaches the latter tangentially and in an area 90° removed therefrom on the support member and is shaped in and also between the aforedescribed areas.

The arrangement for carrying out the afore-described process comprises a disk-shaped driven support member which has a curved working surface that engages the flat iron band. The diameter of this curved surface is slightly smaller than the diameter of the formed rings. At least two pressure rollers bear against the disk-shaped support member and guide and shape the flat iron band. These two pressure rollers are mounted 90° apart from each other around the periphery of the disk-shaped support member and act on the support member in radial directions. A first one of these two pressure rollers bears against the support member in the area where the guided flat iron band guidingly approaches tangentially the support member. The disk-shaped support member has a groove extending around its outer periphery, the upper wall of which is preferably shaped like the segment of a cone. The guide and pressure rollers also have grooves extending around their outer peripheries, the bottoms of which can be adjusted. The arrangement is preferably further provided with an entraining strap when the flat iron band is run in, which engages the flat iron band at its outer side. This strap is secured to the support member frame by means of a plurality of bolts disposed in eccentric bores.

The process and apparatus according to the invention make it possible to continuously manufacture flat closely spaced rings, which thus form a cylindrical package, having a high degree of precision and uniformity with a very simple and cheap apparatus and with a very reduced labor consumption, when compared with known methods of manufacture. The rings thus manufactured can be immediately used and do not require any further processing. Also the process and apparatus of the invention has a greatly increased output of rings when compared with the known methods and apparatuses.

BRIEF DESCRIPTION OF DRAWING

The invention is illustrated, by way of example, in the accompanying drawing which forms part of this application and in which:

FIG. 1 is a partial plan view of the arrangement for carrying out the process of the invention;

FIG. 2 is a side elevational view of the arrangement illustrated in FIG. 1;

FIG. 3 is a plan partial view of the arrangement, similar to FIG. 1, wherein there is illustrated the run of the flat iron band while it is being shaped;

FIG. 4 is a partial elevational view of the disk-shaped supporting member;

DESCRIPTION OF PREFERRED EMBODIMENT

Figure 5:
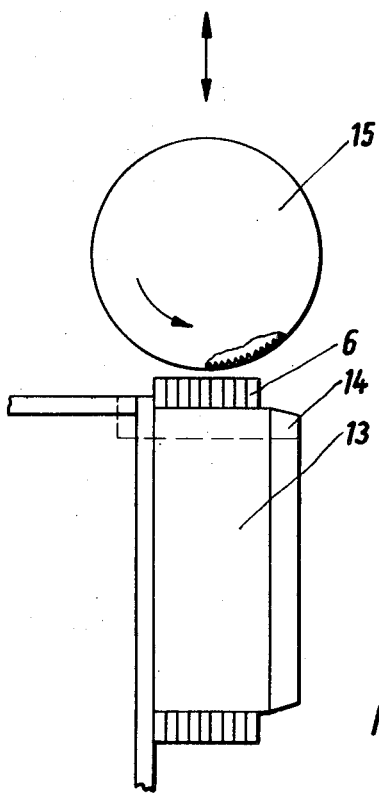
FIG. 5 is an elevational view of the drawn up spiral band shown in the caliber punch and with the cutting tool.

Referring to the drawing the same parts are designated with the same reference numerals. There is illustrated in FIG. 1 a disk-shaped rotatably driven support member 1 around which the flat iron band 6 is bent. As shown in FIG. 2, member 1 is mounted outward of a support therefor. This permits the iron band, which is formed by member 1 in a manner to be described, readily to be removed from the member 1. First and second guide and pressure rollers 2 and 3 are oppositely radially mounted with respect to the support member 1 and are spaced 90° from each other also with respect to the support member 1. The support member 1 is rotatably driven and advances the flat iron band 6. The positions of the guide and pressure rollers 2 and 3 can be respectively radially adjusted by means of spindles 4 and 5, on which they are rotatably mounted, as is indicated with the double arrows in FIG. 1. The rollers 2 and 3 each have a circumferential groove the width of which being adjustable by means of removable disc members forming the base portion of the groove.

In order to start the operation of the device, the flat iron band 6 is inserted between the support member 1 and the roller 2, and thereafter the roller 2 presses firmly the flat iron band 6 against the support member 1. The end of the flat iron band 6 is initially engaged by means of a strap 7 which is secured by means of a bolt or other suitable means in an eccentric bore 8 on the support member 1. The roller 3 is withdrawn to such an extent that, when the support member 1 rotates, it does not obstruct the flat iron band 6. This introductory rotation is indicated by a shift of the bore 8 to the position indicated in dotted lines and designated with the reference numeral 8' in FIG. 1. Thereafter, the roller 3 is moved forwardly toward the support member 1 and now also acts on the flat iron band 6. Simultaneously therewith the strap 7 is disconnected from the support member 1.

While the drive for the support member 1 operates the flat iron band 6 is continuously shaped in the region comprising an arc of 90° between the two guide and pressure rollers 2 and 3, as is illustrated in FIG. 3. The groove 10 of the support member 1 has an upper wall portion 11, which may have the shape of a conical segment but also may have a U-shape. The free end of the flat iron band 6 disengages this groove 10 approximately 240–270° from the beginning of its run around the support member 1. The peripheral enlarging of the flat iron band 6 is caused by inner tensions produced by the shaping process, which also cause the band 6 to tend to run out of the groove 10 in an upward direction. Thus, in a continuous progression of this process, the band 6 will abut against the upper side of the disk-shaped support member 1. In order to insure an upward and outward run of the band 6, there is provided at the underside of the support member 1 an enlarged flange 12, whereas the upper wall 11 of the groove 10, due to its conical shape, does not obstruct the running out of the flat iron band 6.

If rings of large diameters are to be formed with the process of this invention (larger than 1000 mm. diameter), an additional pressure roller 9 may be advantageously mounted on a reciprocally radially movable spindle in order to assure an exact shaping of the band 6 in the aforementioned 90° arc of the support member 1.

Figure 6:
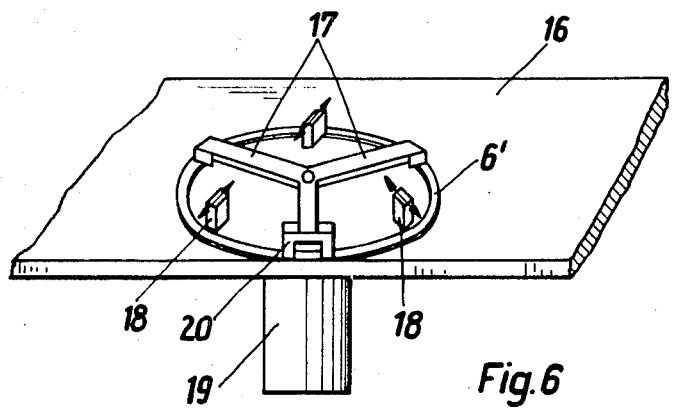
FIG. 6 illustrates in perspective a holding and welding arrangement for welding together the ring ends.

FIG. 5 illustrates the spiral package after it has been, for example, drawn on a mandrel 13, which has at its periphery a longitudinally directed groove 14 that serves to expose the spirals of the band 6, so that the cutting tool 15 may be inserted therein. This cutting tool is illustrated by way of example in FIG. 5 as a circular metal saw. The mandrel 13 has an exterior diameter which corresponds exactly to the final internal diameter of the to be formed rings. When the spiral package is cut into individual rings 6' in the afore-described manner, the latter rings spring back into their original shape prior to being deformed by the spiral winding thereof, so that the final welding step can be easily performed without requiring the application of large forces to the rings 6'. In FIG. 6 there is illustrated how the rings 6' are fixed in position during the welding process. The fixing and retaining arms of a fixing device are designated with the numerals 17. The ring 6' is positioned on a plate 16 by means of three radially reciprocally movable bars 18 and is maintained in position on the plate 16 by means of a vertically movable device having the aforementioned three retaining arms 17. The movement of the vertically movable fixing device is controlled by a pressure cylinder 19 having a piston rod connected to the three-armed fixing device.

The welding arrangement for welding the ends of the ring 6' together is illustrated schematically in FIG. 6 and is designated with the reference numeral 20.

The invention is not restricted to the embodiment described and illustrated herein. Modifications of individual features are intended to be included in the scope of protection afforded by the appended claims. For example, it is possible that the reciprocable movements of the rollers 2 and 3 are hydraulically controlled, rather than by means of reciprocally movable spindles as set forth hereinabove.

What I claim is:

1. In a process for manufacturing flat iron rings from flat iron bands, wherein the flat iron band is continuously wound and formed into a shape of a spiral cylindrical package, the diameter of which substantially corresponds to that of said flat iron rings, the improvement comprising the steps of first presenting the said flat iron band to an annular horizontal support member at an entrance position tangent to said support member, guiding and pressing said flat iron band between a first presser roll and said annular horizontal support member at the entrance position wherein said band extends tangentially to the support member, pressing the curved iron band between a second presser roll and said support member at a position removed substantially 90° about the axis of said support member from the entrance position, and then guiding said flat iron band upwardly so as to form continuous spiral loops above said support member.

2. In an apparatus for manufacturing flat iron rings from flat iron bands, the improvement comprising in combination, an annular disc-like support member rotatably mounted in said apparatus, said support member having an annular groove which has operative pressure surfaces the minimum diameter of which is slightly smaller than the internal diameter of the formed flat rings, means for guiding a flat iron band toward said support member at an entrance location tangent to said support members, said means further comprising pressure members consisting of two pressure rollers radially reciprocably mounted with respect to said annular support member in said apparatus, for pressing said flat iron band against said operative pressure surfaces of said groove, said two pressure rollers being displaced about 90° from each other around the annular periphery of said support member, a first one of said two pressure rollers being positioned to press against said flat iron band in the entrance region where said band extends tangentially toward said annular support member.

3. In an apparatus for manufacturing flat iron rings from flat iron bands, the improvement as set forth in claim 2, wherein the support member is mounted outward of a support therefor, whereby the formed iron band can readily be removed therefrom, and the axially outer portion of said operative pressure surfaces of said groove has the shape of an axially inwardly converging frustum of a cone.

4. In an apparatus for manufacturing flat iron rings from flat iron bands, the improvement as set forth in claim 3, wherein each one of said two pressure rollers has annular groove means adapted to cooperate with said annular groove of said support member and the width of which being adjustable by means of removable disc members forming the base portion of the groove.

5. In an apparatus for manufacturing flat iron rings from flat iron bands, the improvement as set forth in claim 2, wherein said support member 1 has a strap removably and eccentrically mounted thereon, which is adapted to aid in positioning the flat iron band during its running in between the support member and said first pressure roller and which is disconnected from said support member after the running in of said flat iron band is completed.

References Cited

UNITED STATES PATENTS

| | | | |
|---|---|---|---|
| 2,091,136 | 8/1937 | Blount | 72—145 |
| 3,091,025 | 5/1963 | Zallea | 29—156.62 |

FOREIGN PATENTS

| | | | |
|---|---|---|---|
| 637,640 | 5/1950 | Great Britain. | 72—135 |
| 703,462 | 2/1954 | Great Britain. | |
| 552,103 | 11/1956 | Belgium. | |

CHARLES W. LANHAM, Primary Examiner

M. J. KEENAN, Assistant Examiner

U.S. Cl. X.R.

29—156.6; 72—145, 166, 170